US005237125A

United States Patent [19]

Fields

[11] Patent Number: 5,237,125

[45] Date of Patent: Aug. 17, 1993

[54] METHOD AND APPARATUS FOR MEASURING VELOCITY OF KEY MOTION IN A KEYBOARD OPERATED MUSICAL INSTRUMENT

[75] Inventor: Kyle D. Fields, El Dorado Hills, Calif.

[73] Assignee: Burgett, Inc., Sacramento, Calif.

[21] Appl. No.: 822,354

[22] Filed: Jan. 17, 1992

[51] Int. Cl.[5] ................ G01H 1/46

[52] U.S. Cl. ................ 84/626; 84/633; 84/645

[58] Field of Search ................ 84/626, 645, 658, 662, 84/723, 730, 744, 745, 21, 22, DIG. 7, 633

[56] References Cited

U.S. PATENT DOCUMENTS

| | | | |
|---|---|---|---|
| 3,711,617 | 1/1973 | Evans | 84/730 |
| 4,033,219 | 7/1977 | Deutsch | 84/723 |
| 4,172,403 | 10/1979 | Campbell et al. | |
| 4,174,652 | 11/1979 | Campbell | |
| 4,176,578 | 12/1979 | Campbell et al. | |
| 4,351,221 | 9/1982 | Starnes et al. | |
| 4,419,920 | 12/1983 | Ohe | |
| 4,587,877 | 5/1986 | Zacharias | 84/730 |
| 4,628,786 | 12/1986 | Buchla | 84/DIG. 7 |
| 4,768,412 | 9/1988 | Sanderson | 84/DIG. 7 |
| 4,899,631 | 2/1990 | Baker | 84/DIG. 7 |
| 5,010,799 | 4/1991 | Tanaka et al. | 84/633 |
| 5,099,738 | 3/1992 | Hotz | 84/626 |

OTHER PUBLICATIONS 2 page undated brochure by Pennwalt Corporation, Pennsylvania, entitled "Notable Design with Kynar Piezo Film" identified as publication number A–010785.

7 page undated brochure by Pennwalt Corporation, Pennsylvania, identified as publication number TR-1-0-M-6-84-PF 101.

Lee, C. K. and Moon, F. C., Laminated Piezopolymer Plates for Torsion and Bending Sensors and Actuators, published in the Journal of the Acoustical Society of America, Jun. 1989.

Lee, C. K., Theroy of Laminated Piezoelectric Plates for the Design of Distributed Sensors/Actuators. Part I: Governing Equations and Reciprocal Relationships, published in the Journal of the Acoustical Society of America, Mar. 1990.

*Primary Examiner*—Stanley J. Witkowski
*Assistant Examiner*—H. Kim
*Attorney, Agent, or Firm*—John P. O'Banion

[57] ABSTRACT

A method and apparatus for sensing the velocity of key motion in a keyboard operated musical instrument, in which sensors (10) have a polymer piezoelectric film (18) laminated to a mylar backing material (20) are mounted in proximity to the keys (12) of a keyboard operated musical instrument. When deflected by the keys (12), the sensors (10) produce analog circuit output voltages proportional to the velocity of key motion. The analog signals are then converted to digital signals and processed by a digital microprocessor (36) to represent the velocity factor component of musical information in Musical Instrument Digital Interface (MIDI) or other digital formats. The digital data is then presented directly to a reproducing musical instrument or recorded on an electronic storage media.

5 Claims, 3 Drawing Sheets

METHOD AND APPARATUS FOR MEASURING VELOCITY OF KEY MOTION IN A KEYBOARD OPERATED MUSICAL INSTRUMENT

BACKGROUND OF THE INVENTION

1. Field of the Invention

This invention relates generally to reproducing musical performance on keyboard operated musical instruments, and more specifically to measuring the velocity and timing of movement of the keys.

2. Description of the Background Art

In order to reproduce musical performances with more accuracy and realism of expression on a keyboard operated musical instrument, it is essential to have accurate key movement velocity information. Expression, which is a function of the velocity of movement of the key, comprises dynamic changes in volume and playing force, which affects overall volume and tonal quality. For example, in a piano, expression is determined by the velocity of the hammer striking the strings. Therefore, not only must the musical notes and their timing be determined, but the expression contained in the original work must be measured in order to re-recreate a more realistic performance.

Examples of methods and apparatus for recording expression effects can be seen in Campbell et al. U.S. Pat. No. 4,172,403 issued on Oct. 30, 1979, which discloses a method and apparatus for encoding expression data while recording from the keyboard of an electronic player piano wherein the intensity of the music being recorded is reflected in variations in the power of the acoustic waveform produced. Campbell et al. U.S. Pat. No. 4,176,578 issued on Dec. 4, 1979, discloses a system for encoding of bass and treble expression effects in a digital data stream while recording from the keyboard of an electronic player piano. Campbell U.S. Pat. No. 4,174,652 issued on Nov. 20, 1979, discloses a method and apparatus for recording digital signals for later actuating solenoids for re-creation of musical expression. Ohe U.S Pat. No. 4,419,920 issued on Dec. 13, 1983, discloses an apparatus for recording and reproducing musical performances in which the recording comprises the image, the sound, and musical instrument performance data of a particular performance, the watcher-listener being able to see and hear the performance via a video playback and the automatic playing of an actual musical instrument. Starnes et al. U.S. Pat. No. 4,351,221 issued on Sep. 28, 1982, discloses a player piano recording system which has photosensor flags secured to the underside of the piano keys, vertical movement of which is detected by horizontally adjustable photosensors to produce "key played" and key velocity signals which are supplied to a microprocessor for deriving expression signals for recording on magnetic tape.

A limitation of the foregoing methods and devices, however, is that the sensors used can only detect a change in position of the key and, in order to determine the velocity of key movement, it is necessary to calculate velocity based on the timing of the different key positions. This leads to inaccuracies in velocity calculations due to differences in the amount of key stroke as well as difficulty in reproducing notes which were played with a partial key press.

Therefore, there exists a need for a device and technique for recording key velocity without regard to length of stroke or position of the key. The present invention overcomes the deficiencies in the devices and techniques heretofore developed, and provides for accurate recorded of the velocity of key motion in a keyboard operated musical instrument.

The foregoing patents reflect the state of the art of which the applicant is aware and are tendered with the view toward discharging applicant's acknowledged duty of candor in disclosing information which may be pertinent in the examination of this application. It is respectfully stipulated, however, that none of these patents teach or render obvious, singly or when considered in combination, applicant's claimed invention.

SUMMARY OF THE INVENTION

The present invention overcomes the limitations of prior devices and techniques by using sensors (or transducer elements) which produce a voltage proportional to the velocity of the key strike or release. Because this output voltage is not related to the physical position of the key, velocity of key motion can be accurately determined even for a partial key strike.

The invention utilizes a thin, pliant, flexible, polymer piezoelectric film laminated to a thicker flexible backing material. When the entire composite sensor is bent downward, the piezoelectric film is placed under a stretching stress as it is bent over the thicker backing material. This laminated construction serves to amplify the output voltage of the sensor to a level much greater than would be produced by bending the piezoelectric film itself.

The resulting lamination is shaped in the form of a "finger" that extends from a mounting bracket to the underside of the key of the instrument. When the key is pressed, deflection of the piezoelectric film produces an analog voltage signal with an amplitude proportional to the velocity of the key motion. When the key is released, the film returns to its rest position, during which time a similar voltage signal is produced but with opposite polarity.

Each key on the keyboard actuates a single finger shaped sensor element. On a typical piano, this results in 88 sensors, one for each key. The signal produced by the sensors will be bipolar representing the velocity of key strike and release. Analog to digital converters are used to sense the voltage produced and convert the signals into digital signals for processing by a microprocessor.

The microprocessor scans each sensor once every 2 milliseconds and determines the maximum voltage produced by the corresponding key. Data for a particular key is averaged to determine the velocity of the key strike and release. The microprocessor then produces signals corresponding to the velocity factor component of musical information in Musical Instrument Digital Interface format or other digital formats which can be input to a variety of electronic musical instruments or recorded on an electronic storage media. The timing of the key release is also determined and input or recorded in a similar manner.

An object of the invention is to accurately sense velocity of key movement in a keyboard operated musical instrument.

Another object of the invention is to provide for low cost sensor construction.

Another object of the invention is to sense velocity of key movement directly without the need to perform intermediate calculations.

Another object of the invention is to provide for a velocity sensor which is unaffected by length of key stroke.

Another object of the invention is to provide for a velocity sensor which can accurately sense velocity of partial key strokes.

Another object of the invention is to measure velocity of key movement in Musical Instrument Digital Interface format and other digital formats.

Further objects and advantages of the invention will be brought out in the following portions of the specification, wherein the detailed description is for the purpose of fully disclosing preferred embodiments of the invention without placing limitations thereon.

BRIEF DESCRIPTION OF THE DRAWINGS

The invention will be more fully understood by reference to the following drawings which are for illustrative purposes only.

DESCRIPTION OF THE PREFERRED EMBODIMENTS

Referring more specifically to the drawings, for illustrative purposes the present invention is embodied in the apparatus which is generally shown in FIG. 1 through FIG. 4. It will be appreciated that the apparatus may vary as to configuration and as to details of the parts without departing from the basic concepts as disclosed herein.

Figure 1:
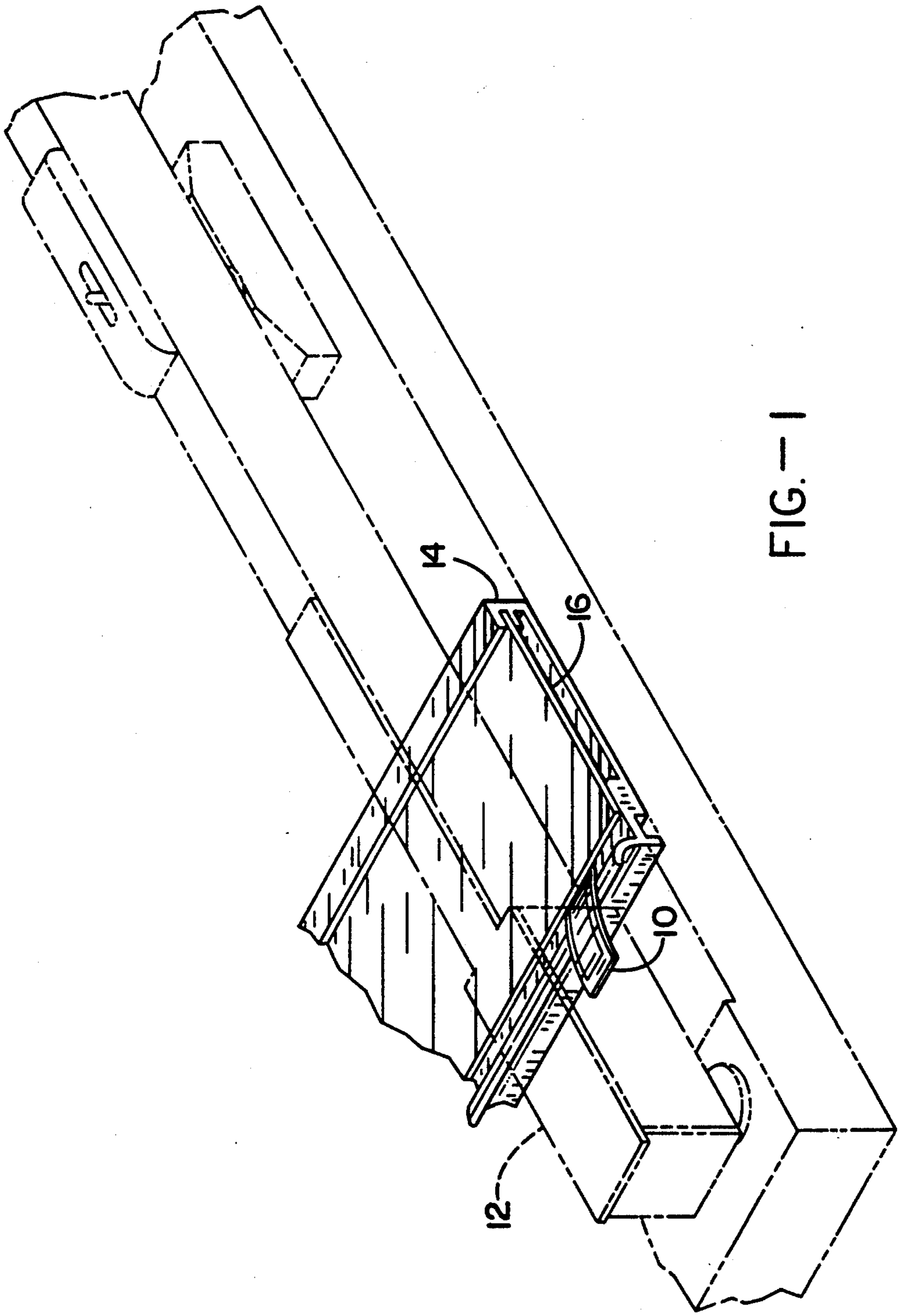
FIG. 1 is a perspective view of a portion of an exemplary sensor of the present invention mounted in proximity to a key of a keyboard operated musical instrument shown in phantom.
Figure 2:
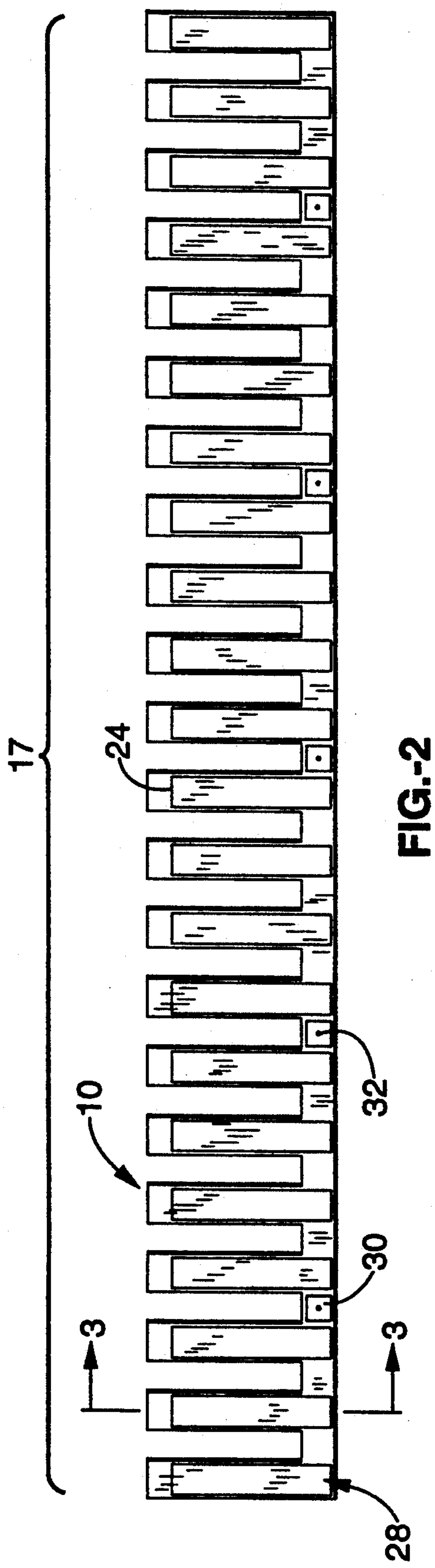
FIG. 2 is a top plan view of an exemplary array of sensors for mounting beneath the keys of a keyboard operated musical instrument.

FIG. 1 shows a sensor or transducer element 10 which has been adapted for mounting in proximity to key 12 of a piano. Note, however, that sensor 10 of the apparatus can be mounted in this or a similar fashion in proximity to a key of any keyboard operated musical instrument. Bracket 14 affixes sensor 10 in position and supports circuit board 16 containing circuitry related to the apparatus. Referring also to FIG. 2, a plurality of sensors 10 can be configured into an array 17 so that individual sensors 10 can be conveniently mounted beneath the keys of an instrument having a plurality of keys.

Figure 3:
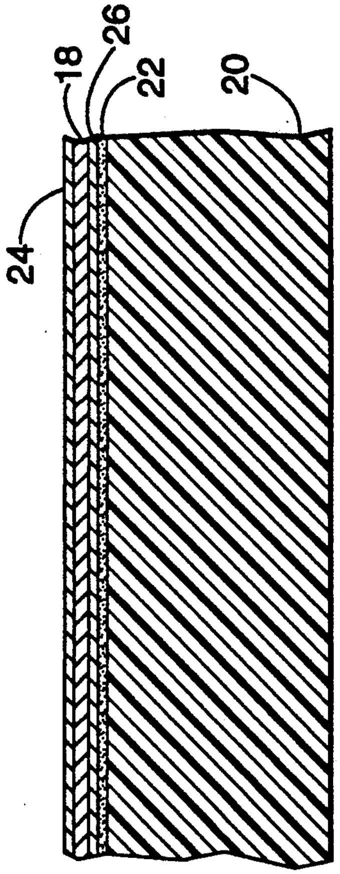
FIG. 3 is a cross-sectional view of the laminated sensor element of the sensor array shown in FIG. 2 taken through lines 3—3.

Referring to FIG. 2 and FIG. 3 together, a typical sensor 10 is fabricated by laminating piezoelectric film 18 to mylar backing material 20 using adhesive 22. Conductive ink 24, 26 is then used to provide a path for electrical connections to piezoelectric film 18. One side of an individual sensor 10 is electrically connected to a wire, circuit board trace, or the like at output terminal 28 which provides for a separate and individual connection. The other side of each sensor 10 is commonly connected at reference terminal 30 which has been etched in piezoelectric film 18 thereby creating an isolated pad. Output terminal 28 is established by conductive ink 24. Reference terminal 30 is established by inserting a hole 32 through piezoelectric film 18 and running conductive ink 26 from the underside of piezoelectric film 18, through hole 32, and on to the pad for reference terminal 30. Reference terminal 30 is then connected to a wire, circuit board trace, or the like. It can be seen, therefore, that it is important to establish a connection to each side of sensor 10 where one side of each sensor is isolated from every other sensor, and where the other side of each sensor is commonly connected to the other sensors.

FIG. 3 shows a cross-section of a typical lamination configuration for sensor 10. Conductive ink 24, 26 is of conventional materials as is adhesive 22. Piezoelectric film 18 is preferably a material which is pliant, lightweight, flexible and tough. While conventional piezoelectric materials such as quartz and barium titanate will transform a mechanical force into an electrical response, but are too dense, brittle, and stiff to use in an application which requires the material to be flexed. Piezoelectric films which use a base resin such as vinylidene fluoride or polyvinylidene fluoride are preferred, although other polymeric piezoelectric films could be used. These films are highly resistive and particularly suited to the electrical connection techniques described above.

Backing material 20 is preferably mylar, but other materials could be used so long as they are flexible and substantially non-conductive. In the preferred embodiment, piezoelectric film 28 is one mil in thickness and backing material 20 is fifteen mils in thickness.

When piezoelectric film 18 is bent or flexed, the resultant mechanical stress produces an output voltage which is proportional to the velocity of movement. Because the material is bipolar, flexing piezoelectric film 18 in opposite directions from a neutral reference point produces output voltages of reversed polarity. By laminating piezoelectric film 18 to backing material 20, the output voltage can be increased as a result of increased stress on piezoelectric film 18 when it is stretched or flexed over backing material 20. Therefore, when sensor 10 is deflected by movement of key 12, an output voltage is produced which is proportional to the velocity of movement of key 12. Because of the bipolar characteristic of piezoelectric film 18, the direction of motion can be determined with reference to the polarity of the output voltage.

Figure 4:
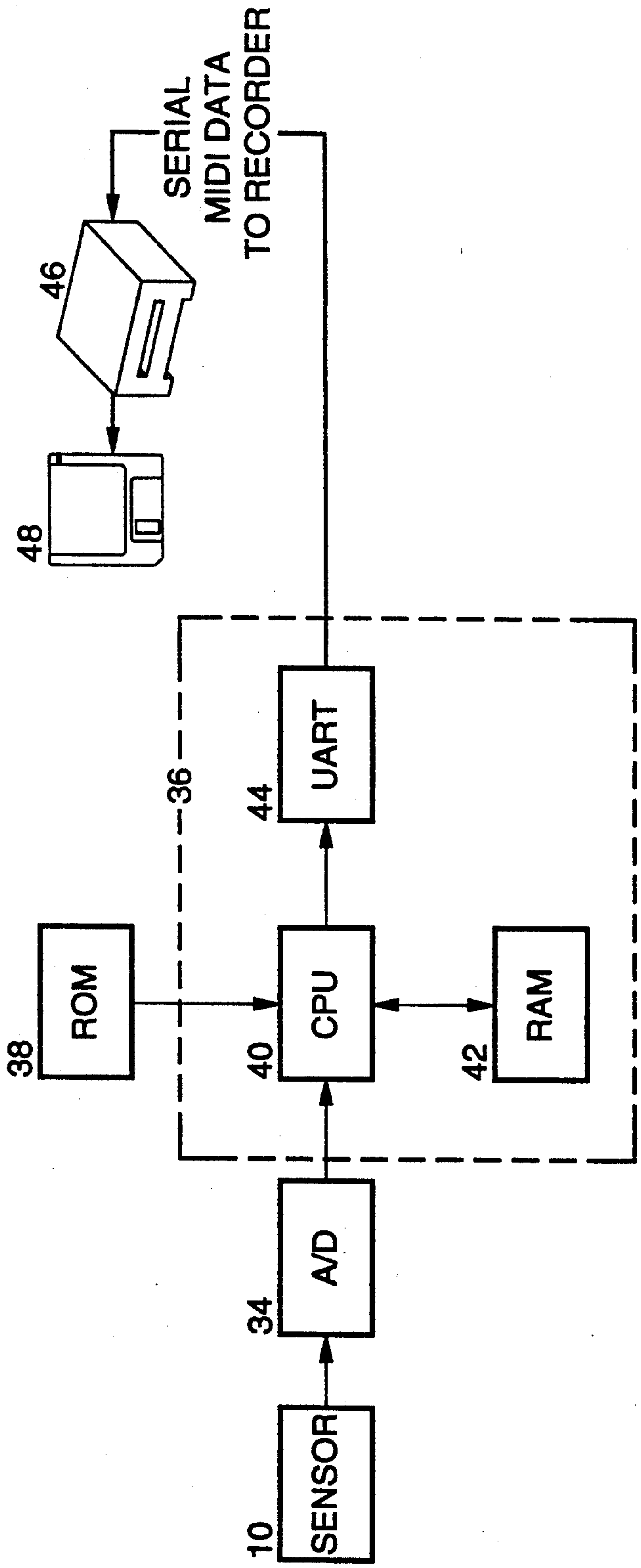
FIG. 4 is a functional block diagram showing the apparatus of the present invention.

Referring now to FIG. 4, the apparatus of the present invention includes analog to digital convertor 34 which is electrically coupled to sensor 10. In a typical embodiment for a piano keyboard, analog to digital convertor 34 includes eleven input lines for multiplexing output voltages from eleven individual sensors, and a total of eight analog to digital convertors are used. Microprocessor 36, which is typically an eight bit microcontroller, scans each sensor 10 every two milliseconds and processes the information by assigning a velocity factor corresponding to the digital representation of the analog voltage produced by piezoelectric film 18. The timing of the key release is also determined. Any calibration required to reflect variations in output of sensors 10 is performed by microprocessor 36 as necessary.

Read only memory 38, which is conventional 8K ROM, contains "look-up" tables created by test data. Data in the look-up tables provides correspondence between voltage output levels from sensor 10 and velocity factor components of musical information, and serves to translate the voltages produced by sensor 10 into serial digital data representing velocity factor components.

Microprocessor 36 includes central processing unit 40 which controls operation of the apparatus, random access memory 42 which contains working variables, and UART 44 which serves as a communications interface. While these components are internal to microprocessor 36, separate conventional circuitry could be used.

Data comprising velocity factor components of musical information, key release timing, and direction of key movement is routed to a musical instrument for reproduction of expression through UART 44. In addition, serial data in Musical Instrument Digital Interface format can be routed to a recorder 46 for storage on a disk 48. It should be noted, however, that the output data can be presented in any convenient format and that other communications, recording, or storage device could be used.

It will be appreciated that the apparatus and methods disclosed herein could also be applied to measuring velocity of pedal movement in pianos, or for measuring the velocity of movement of other components of a musical instrument. Although the description above contains many specificities, these should not be construed as limiting the scope of the invention but as merely providing illustrations of some of the presently preferred embodiments of this invention. Thus the scope of this invention should be determined by the appended claims and their legal equivalents.

I claim:

1. A method of sensing the velocity of key motion in a keyboard operated musical instrument, comprising the steps of:

(a) positioning a piezoelectric transducer in proximity to a key in a keyboard operated musical instrument, said transducer producing an analog output voltage proportional to the velocity of motion of said key;

(b) converting said analog output voltage into a digital signal representing the amplitude of said analog output voltage;

(c) processing said digital signal into a velocity signal representing the velocity factor component of musical information in Musical Instrument Digital Interface format; and (d) recording said velocity signal on a machine readable storage media.

2. The method recited in claim 1, further comprising the steps of:

(a) sensing the polarity of said analog output voltage; and (b) converting said polarity into a directional signal representing the direction of motion of said key.

3. A process for recording velocity of key motion in a keyboard operated musical instrument, comprising the steps of:

(a) positioning a flexible polymer piezoelectric film sensor in proximity to a key of said keyboard operated musical instrument;

(b) converting an analog output voltage produced when said sensor is deflected by said key to a digital signal representing amplitude of said analog output voltage;

(c) converting said digital signal to a velocity signal representing a velocity factor component of musical information in Musical Instrument Digital Interface format; and (d) recording said velocity signal on a machine readable storage media.

4. The process recited in claim 3, further comprising the steps of:

(a) sensing the polarity of said analog output voltage; and (b) converting said polarity into a directional signal representing direction of motion of said key; and (c) recording said directional signal on said machine readable storage media.

5. The process recited in claim 3, further comprising the step of processing said directional signal to determine whether said velocity signal corresponds to the strike or release of said key.

* * * * *